(12) United States Patent
Mundt

(10) Patent No.: US 7,182,674 B2
(45) Date of Patent: Feb. 27, 2007

(54) COOLANT DELIVERY APPARATUS FOR MACHINE TOOL

(75) Inventor: Eric G. Mundt, Rochester, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 10/812,687

(22) Filed: Mar. 30, 2004

(65) Prior Publication Data

US 2005/0009454 A1    Jan. 13, 2005

Related U.S. Application Data

(60) Provisional application No. 60/459,122, filed on Mar. 31, 2003.

(51) Int. Cl.
*B24B 1/00* (2006.01)
*B24B 55/02* (2006.01)

(52) U.S. Cl. .............................. 451/53; 451/7; 451/449

(58) Field of Classification Search .................. 451/53, 451/449, 450
See application file for complete search history.

(56) References Cited

U.S. PATENT DOCUMENTS

| | | | |
|---|---|---|---|
| 1,924,162 A * | 8/1933 | Mason | 83/311 |
| 3,025,647 A * | 3/1962 | Moody | 451/411 |
| 4,575,285 A | 3/1986 | Blakesley | |
| 4,619,078 A | 10/1986 | Uhlig | |
| 4,739,586 A * | 4/1988 | Eckardt et al. | 451/251 |
| 5,313,743 A | 5/1994 | Peschik | |
| 5,890,846 A | 4/1999 | Clark et al. | |
| 6,120,217 A | 9/2000 | Stadtfeld et al. | |
| 6,712,061 B1 * | 3/2004 | Kalb | 125/10 |
| 2003/0148717 A1 | 8/2003 | Mundt | |

FOREIGN PATENT DOCUMENTS

| | | |
|---|---|---|
| DE | 3422213 | 1/1985 |
| DE | 29915499 | 12/1999 |
| EP | 0305616 | 3/1989 |
| EP | 1151823 | 11/2001 |

\* cited by examiner

Primary Examiner—M. Rachuba
(74) Attorney, Agent, or Firm—Robert L. McDowell

(57) ABSTRACT

A coolant delivery apparatus for a machine tool wherein the position of the coolant delivery apparatus is controllable such that coolant may be delivered to the machining contact zone of a tool even though the location of the machining zone of the tool may change such as during machining of a workpiece, or from one workpiece to another.

15 Claims, 7 Drawing Sheets

US 7,182,674 B2

COOLANT DELIVERY APPARATUS FOR MACHINE TOOL

This application claims the benefit of U.S. Provisional Patent Application No. 60/459,122 filed Mar. 31, 2003.

FIELD OF THE INVENTION

The present invention is directed to machine tools and in particular to an apparatus for delivering coolant to a tool and workpiece during machining, especially during grinding of cutting blades.

BACKGROUND OF THE INVENTION

It is well known to manufacture gears, such as bevel and hypoid gears, with stick-type cutting blades made from, for example, high speed steel or carbide materials. It is further known that to form, or to restore, the desired surfaces and edges on stick-type cutting blades, grinding operations must be performed on the cutting blades. Examples of such cutting blades can be found in U.S. Pat. No. 4,575,285 to Blakesley; U.S. Pat. No. 5,890,846 to Clark et al. or U.S. Pat. No. 6,120,217 to Stadifeld et al. Cutting blades of this type have cutting and clearance profile surfaces as well as a top surface that are ground during sharpening. Other cutting blades are known where in addition to grinding the cutting, clearance and top surfaces as described above, the front face of the cutting blade is also ground when sharpening.

Cutting blade grinding machines (which also may be referred to as "sharpening" machines) for grinding cutting blades include some type of clamping mechanism for holding one or more cutting blades in position during grinding. Such clamping mechanisms generally hold a cutting blade in an angled orientation with respect to the axis of the clamping mechanism, or, in a "zero angle" orientation wherein the cutting blade is positioned coincident or parallel with the axis of the clamping mechanism.

In grinding a cutting blade in an angled orientation, the area of contact between the cutting blade and the grinding wheel generally stays in about the same location on the grinding wheel because the clamping mechanism remains in the same position (or 180 degrees relative to that position) during grinding. Such positioning keeps the top surface of the cutting blade positioned relative to the grinding wheel at about the same area of the grinding wheel during the grinding process. Thus, when introducing coolant during the grinding process, one or more coolant nozzles can be positioned and allowed to remain in the same position as the cutting blade is ground. However, with clamping mechanisms of the angled type, the orientation of a cutting blade is dependent upon the top angle of the cutting blade as well as the mounting angle of the cutting blade in its intended cutter head. Therefore, grinding cutting blades with different top or mounting angles requires different clamping mechanisms or positioning inserts in the clamping mechanism to accommodate the different cutting blades.

With clamping mechanisms of the "zero angle" type, the orientation of each blade remains parallel with the axis of the clamping mechanism during grinding. However, if it becomes necessary to rotate the clamping mechanism to different positions during grinding in order to properly grind the different surfaces on the cutting blade, the location of the contact area on the grinding wheel change may change. Thus, it becomes necessary to either reorient the positions of coolant nozzles or provide a plurality of coolant nozzles positioned to account for the different locations of the grinding area on the grinding wheel. Usually, coolant lines extend from a coolant header mounted stationary on the grinding wheel side of the machine. Having many coolant lines, and hence many coolant nozzles, can result on interference situations with machine components as well as requiring a greater volume of coolant as the number of lines increases.

SUMMARY OF THE INVENTION

The present invention is directed to a coolant delivery apparatus for a machine tool wherein the position of the coolant delivery apparatus is controllable such that coolant may be delivered to the machining zone of a tool even though the location of the machining zone of the tool may change such as during machining of a workpiece, or from one workpiece to another.

DETAILED DESCRIPTION OF THE PREFERRED EMBODIMENT

Figure 1:
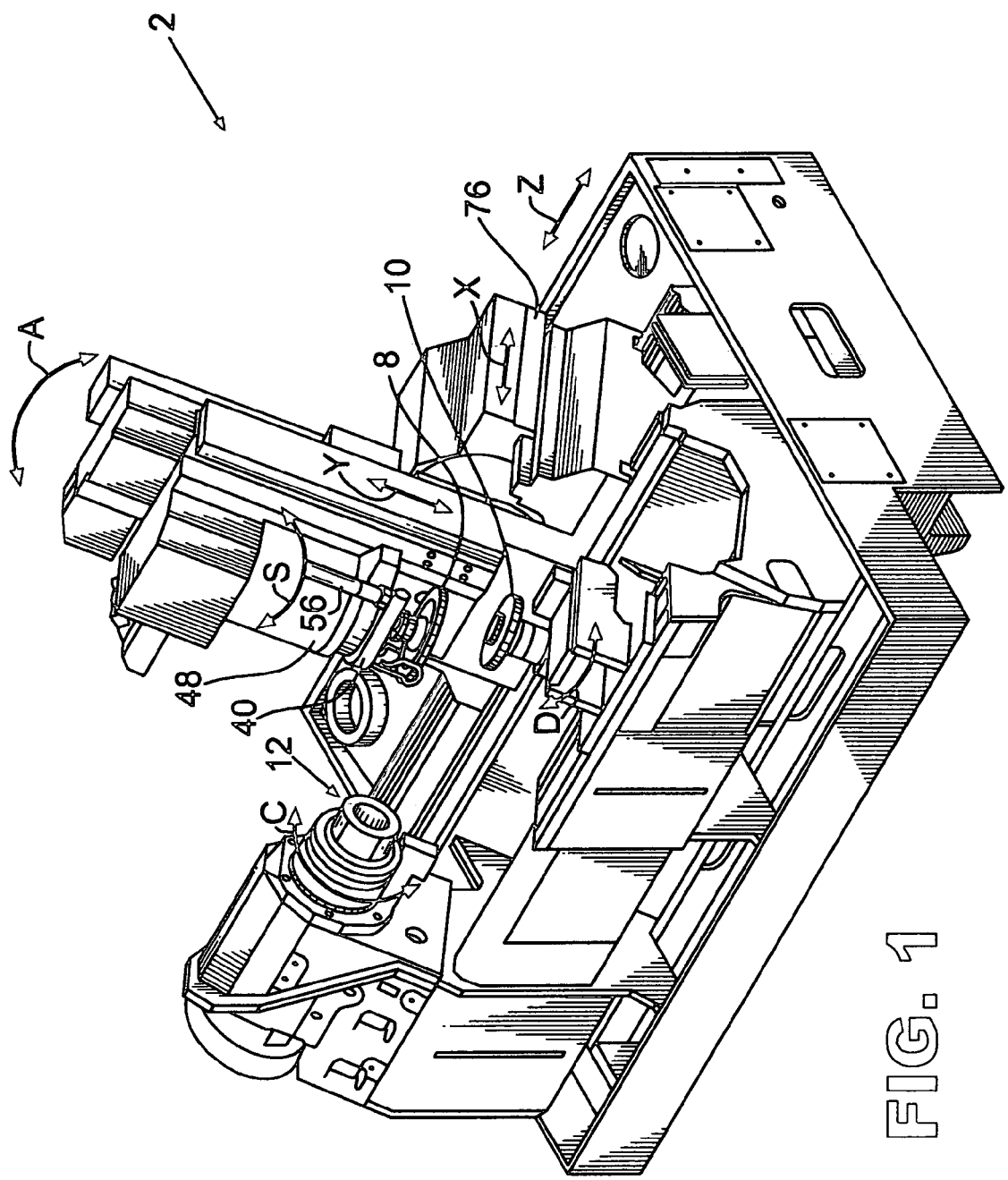
FIG. 1 illustrates a type of cutting blade grinding machine on which the inventive coolant delivery apparatus may be included.

In the drawings, which illustrate the present invention by way of example only, like components will be identified with the same reference number.

FIG. 1 illustrates one type of cutting blade grinding machine 2. The machine is shown only with those elements necessary to gain a general understanding of the machine since the machine, per se, is not part of the present invention. Machines of this type are commercially available, for example, from The Gleason Works, Rochester, N.Y.

In FIG. 1, grinding machine 2 includes a workpiece clamping mechanism 12 rotatable in a direction C about the axis of the clamping mechanism and a grinding wheel 6 rotatable in a direction S about the axis of the grinding wheel. The grinding wheel is movable relative to the clamping mechanism in three linear directions X, Y and Z (preferably mutually perpendicular) and is angularly positionable in a direction A. The grinding machine includes a dressing mechanism 10, rotatable in a direction D, for periodic restoration of the surface of the grinding wheel 8.

Figure 2:
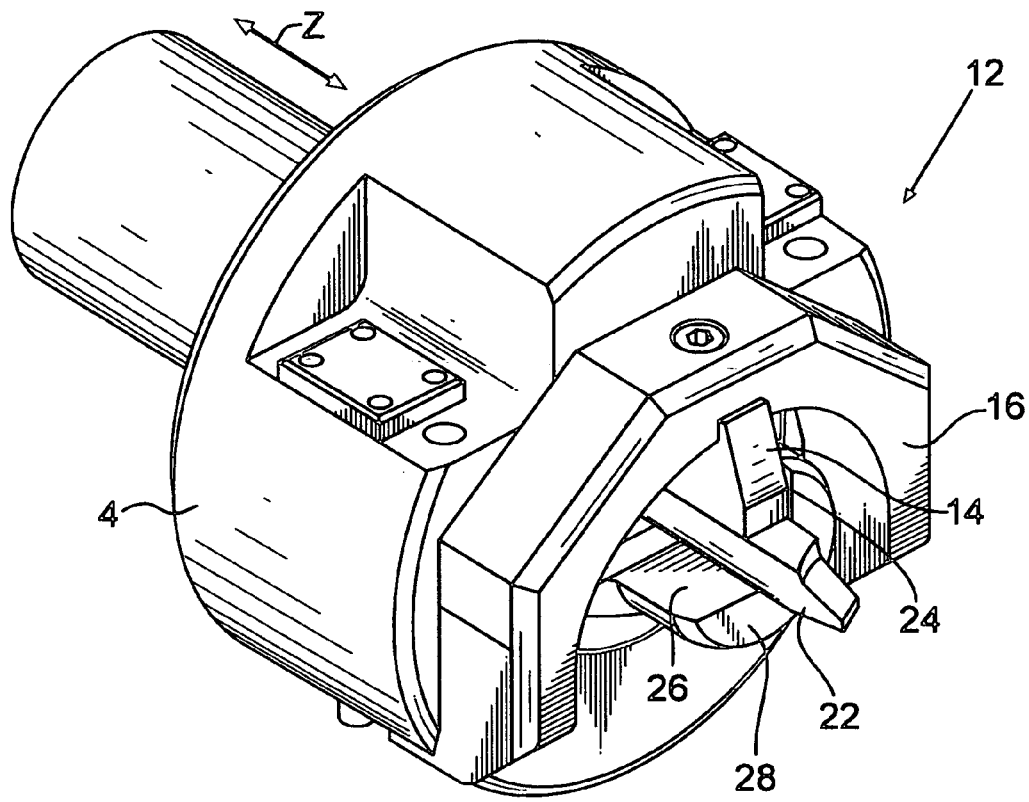
FIG. 2 shows an example of a "zero angle" cutting blade clamping mechanism.

FIG. 2 illustrates a known type of "zero angle" clamping mechanism 12 in which is secured a stick-type cutting blade 22. Clamping mechanism 12 comprises an outer ring portion 4 having at least one clamp 14 attached to clamp bracket 16.

Clamp 14 engages cutting blade 22 to clamp it in position against mounting surfaces 24 and 26 which together define a mounting slot of mounting block 28. The clamping mechanism is rotationally positionable so that a cutting blade can be brought to different positions such that, if process parameters dictate, all appropriate surfaces can be ground.

When cutting blades are sharpened, it is important to direct coolant such that the cutting blade as well as the grinding wheel are adequately cooled and lubricated and, the material removed from the cutting blades is efficiently washed away from the cutting blade and grinding wheel. Proper placement of coolant nozzles is, therefore, essential so that the above objectives are accomplished.

Figure 3A:
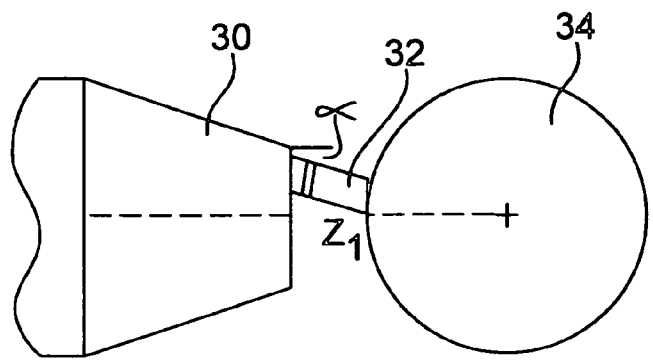
FIGS. 3(a) and 3(b) illustrate grinding zones of a grinding wheel with a cutting blade positioned in an "angled" clamping mechanism.
Figure 3B:
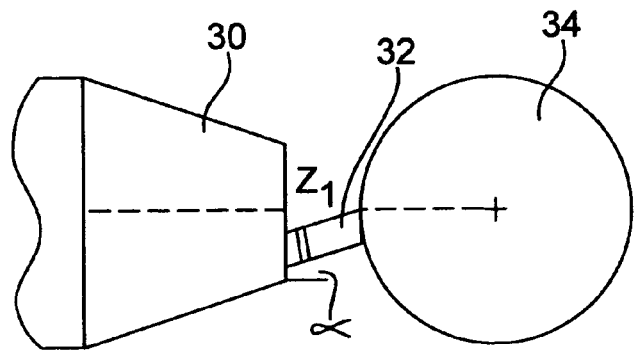

As mentioned above, for angled clamping mechanisms, such as shown in FIGS. 3(*a*) and 3(*b*), rotating the clamping mechanism 30 by 180 degrees in order to grind the cutting and clearance side surfaces of a stick-type cutting blade 32 brings the top of the cutting blade to about the same area or zone, $Z_1$, of the grinding wheel 34. This is due to the cutting blade 32 being mounted in the clamping mechanism 30 at an angle a based on the top angle of the cutting blade and the angle of inclination of the cutting blade in its intended cutter head. Providing coolant to the grinding wheel and cutting blade is a matter of orienting a desired number of coolant nozzles to provide coolant to the zone $Z_1$ which does not change significantly when the cutting blade is repositioned to grind the other side surface.

Figure 4A:
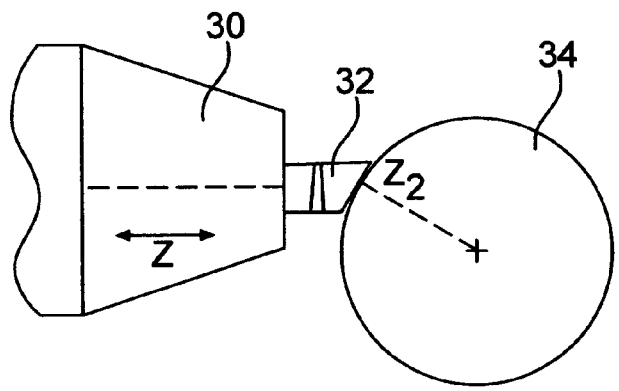
FIGS. 4(a) and 4(b) illustrate grinding zones of a grinding wheel with a cutting blade positioned in a "zero angle" clamping mechanism.
Figure 4B:
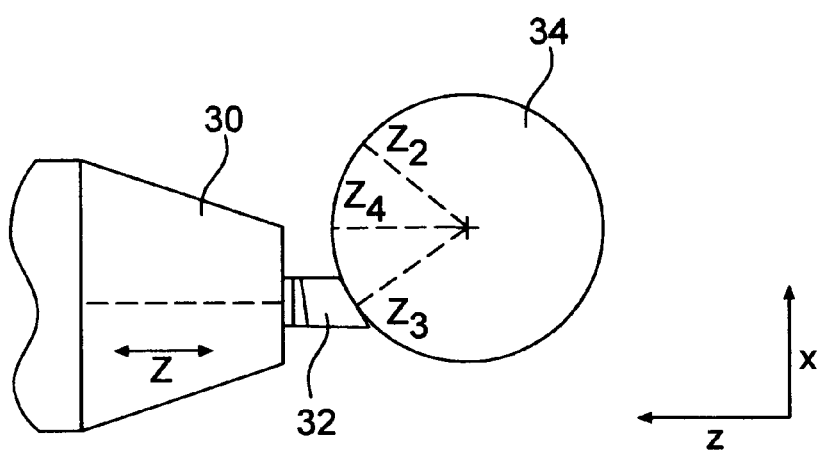

In FIGS. 4(*a*) and 4(*b*) a "zero angle" clamping mechanism 40 is shown. With this type of clamping, and under certain process conditions such as utilizing dedicated edges of the grinding wheel for roughing and finishing operations such as described in commonly assigned U.S. Patent Application Publication No. 2003/0148717, the disclosure of which is hereby incorporated by reference, rotation of the clamping mechanism to position the cutting blade 32 for grinding the cutting and clearance sides is accompanied by relative movement of the grinding wheel 34 and cutting blade 32 to reposition the grinding wheel appropriately for grinding the respective side surface. For example, in FIG. 4(*a*), one side of cutting blade 32 is ground at zone $Z_2$ of grinding wheel 34 while in order to grind the other side of cutting blade 32 with the same edge of the grinding wheel, clamping mechanism 30 is rotated to reposition cutting blade 32 and grinding now occurs at zone $Z_3$ of grinding wheel 34 (FIG. 4(*b*)). Additionally, other surfaces of the cutting blade 32 may require repositioning the clamping mechanism again, such as grinding the front face, thereby resulting in another zone of the grinding wheel being utilized, for example, zone $Z_4$ in FIG. 4(*b*).

In moving the grinding wheel 34 from zone $Z_2$ to zone $Z_3$, relative movement between the grinding wheel and cutting blade must occur. If the page of FIGS. 4(*a*) and 4(*b*) is considered to represent the X-Z plane of the machine of FIG. 1, it can be seen that movement to different zones on grinding wheel 34 involves relative movement between the cutting blade and grinding wheel at least in the X direction. It can be seen that coolant nozzles positioned about the grinding wheel at zone $Z_2$ will be sufficient as long as grinding takes place at zone $Z_2$. However, upon shifting of the grinding to another zone, such as $Z_3$ and/or $Z_4$ for example, optimum coolant flow will still be directed to zone $Z_2$.

Figure 5:
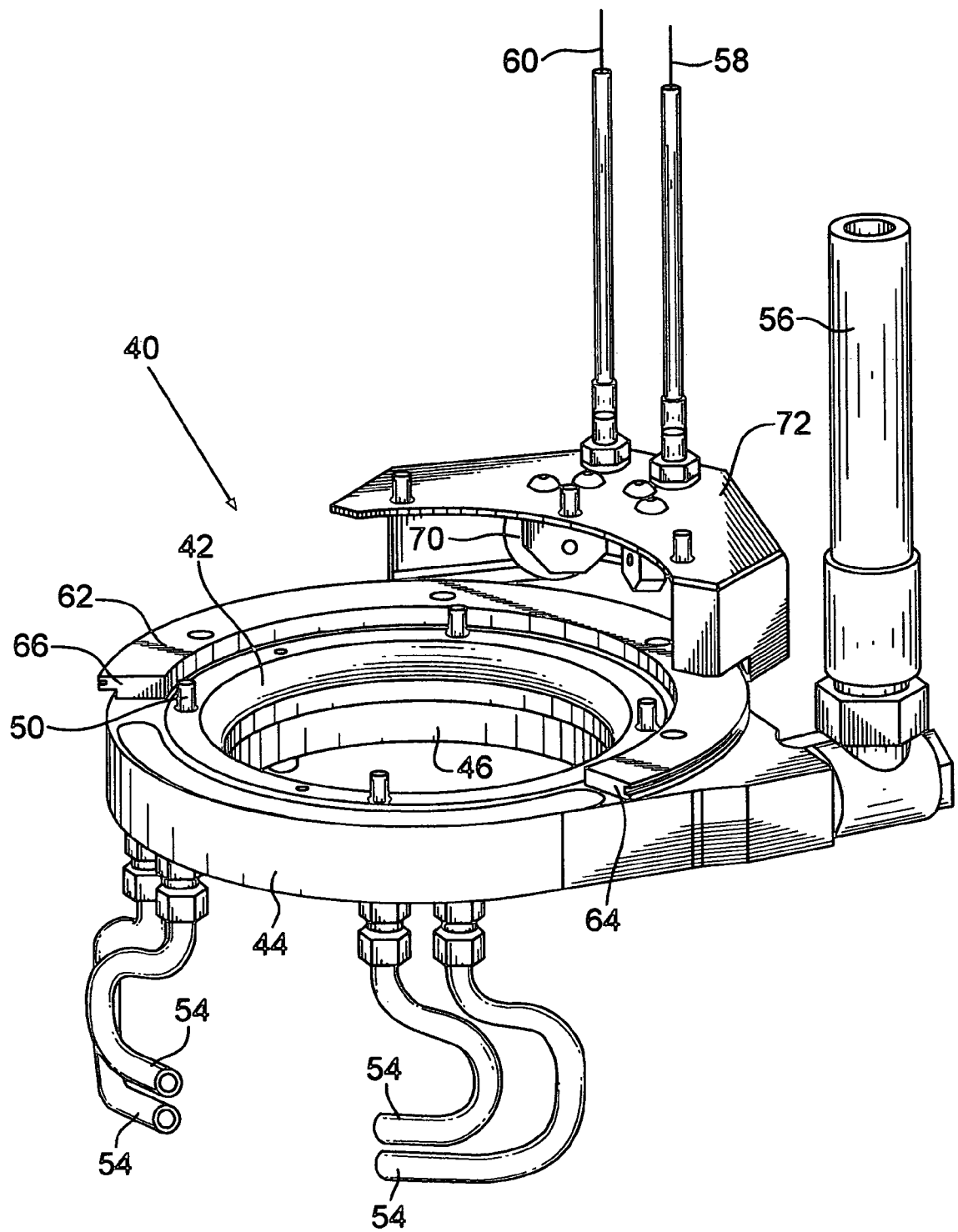
FIG. 5 illustrates an elevated view of a preferred embodiment of the inventive coolant delivery apparatus.
Figure 6:
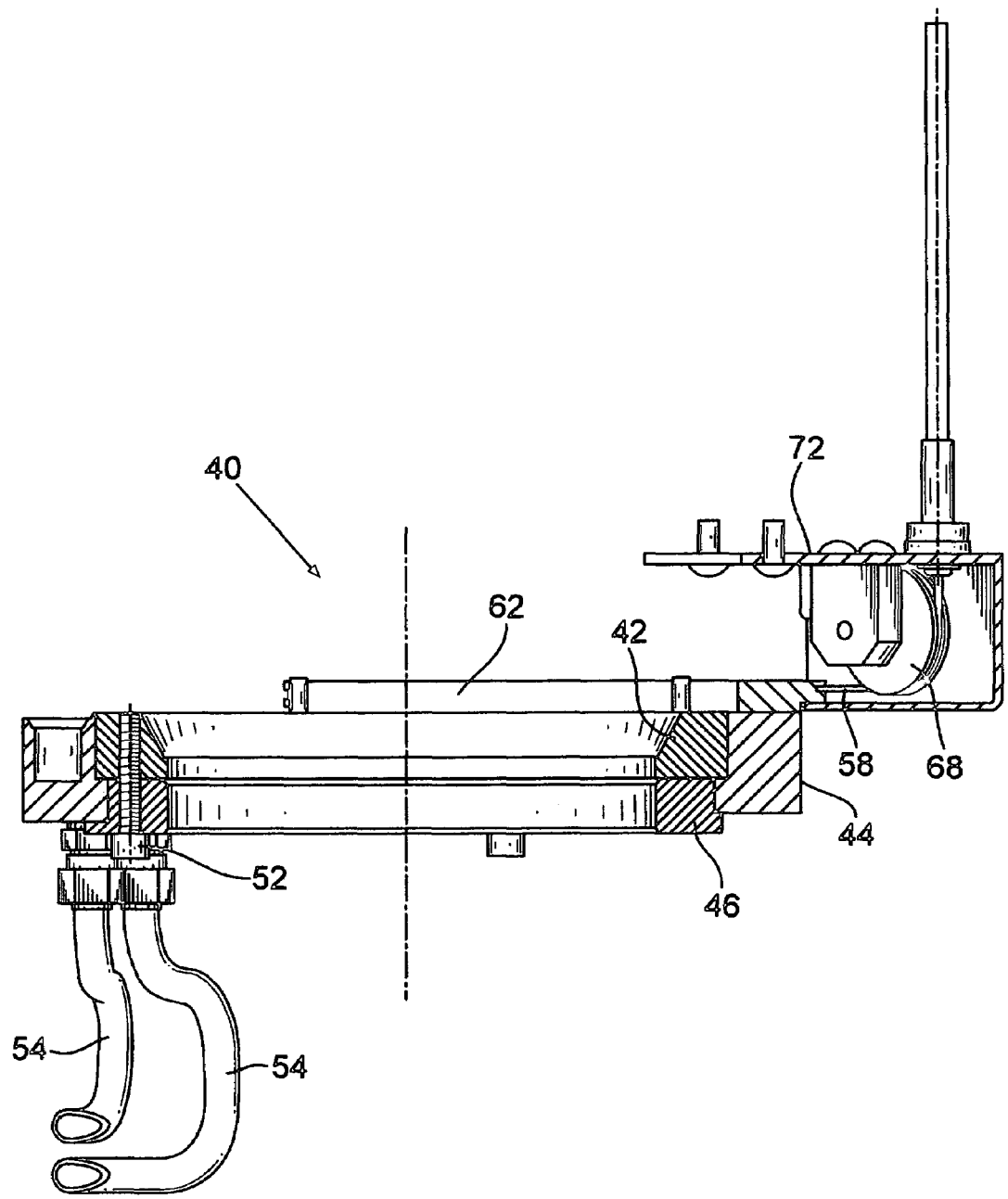
FIG. 6 illustrates a cross-sectional view of the embodiment of the inventive coolant delivery apparatus of FIG. 5.

The inventor has developed a coolant delivery assembly to address the drawback discussed above. FIGS. 5 and 6 show the inventive coolant assembly 40 comprising a generally ring-shaped configuration having a mounting adapter 42, a coolant header 44 and a retaining cap 46. The coolant assembly is preferably positioned attached to the end of the spindle housing 48 (FIGS. 1 or 7) of the grinding wheel spindle 49 via the mounting adapter 42 by a plurality of screws 50 (four are shown). The coolant header 44 is positionable and rotatable about mounting adapter 42. Retaining cap 46 is attached to mounting adapter 42 by a plurality of screws 52 (one shown in FIG. 6) to keep the coolant header 44 in position. Coolant header 44 is also rotatable about retaining cap 46.

Figure 7:
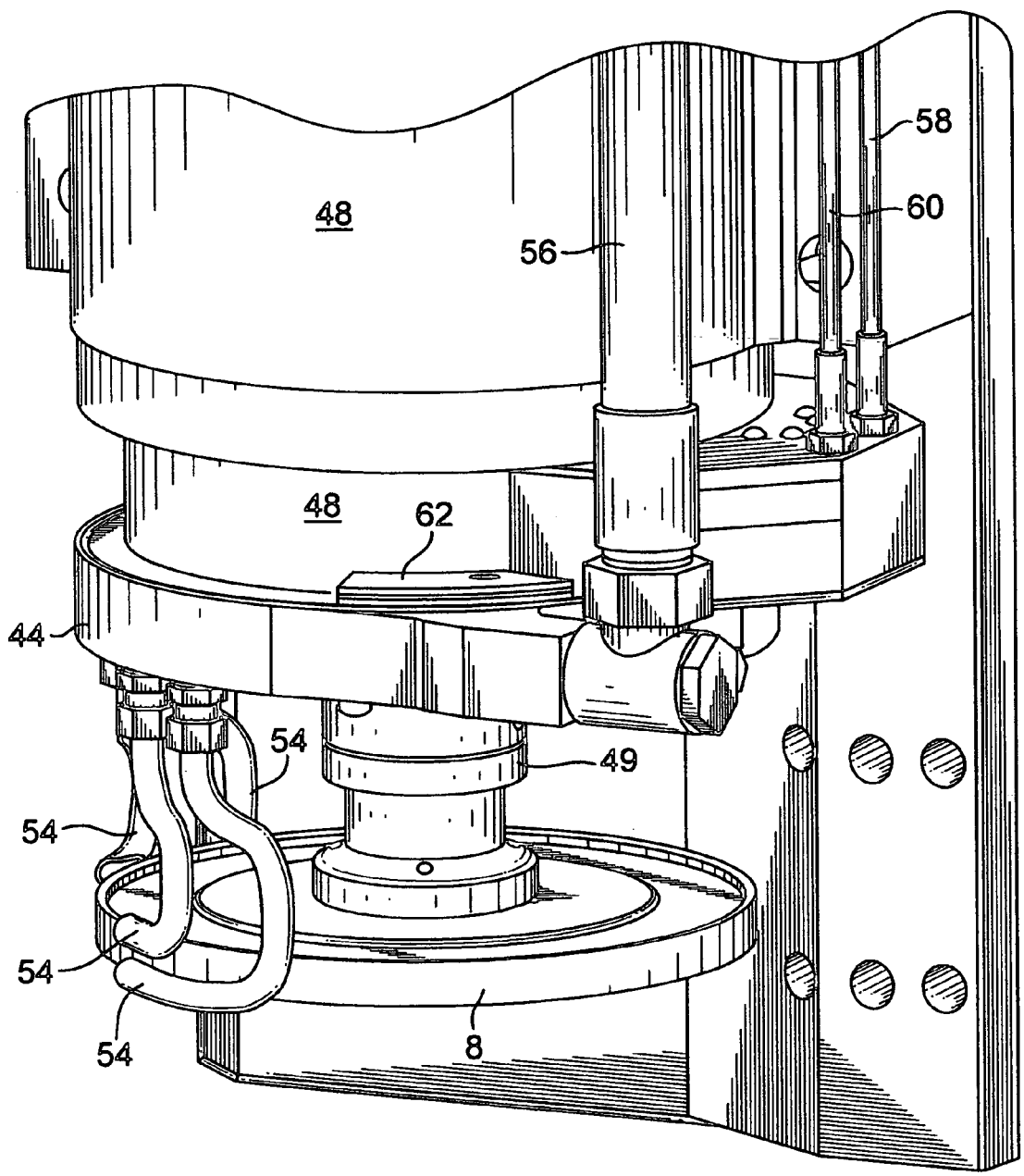
FIG. 7 shows the inventive embodiment of FIG. 5 in position on a cutting blade grinding machine.
Figure 8:
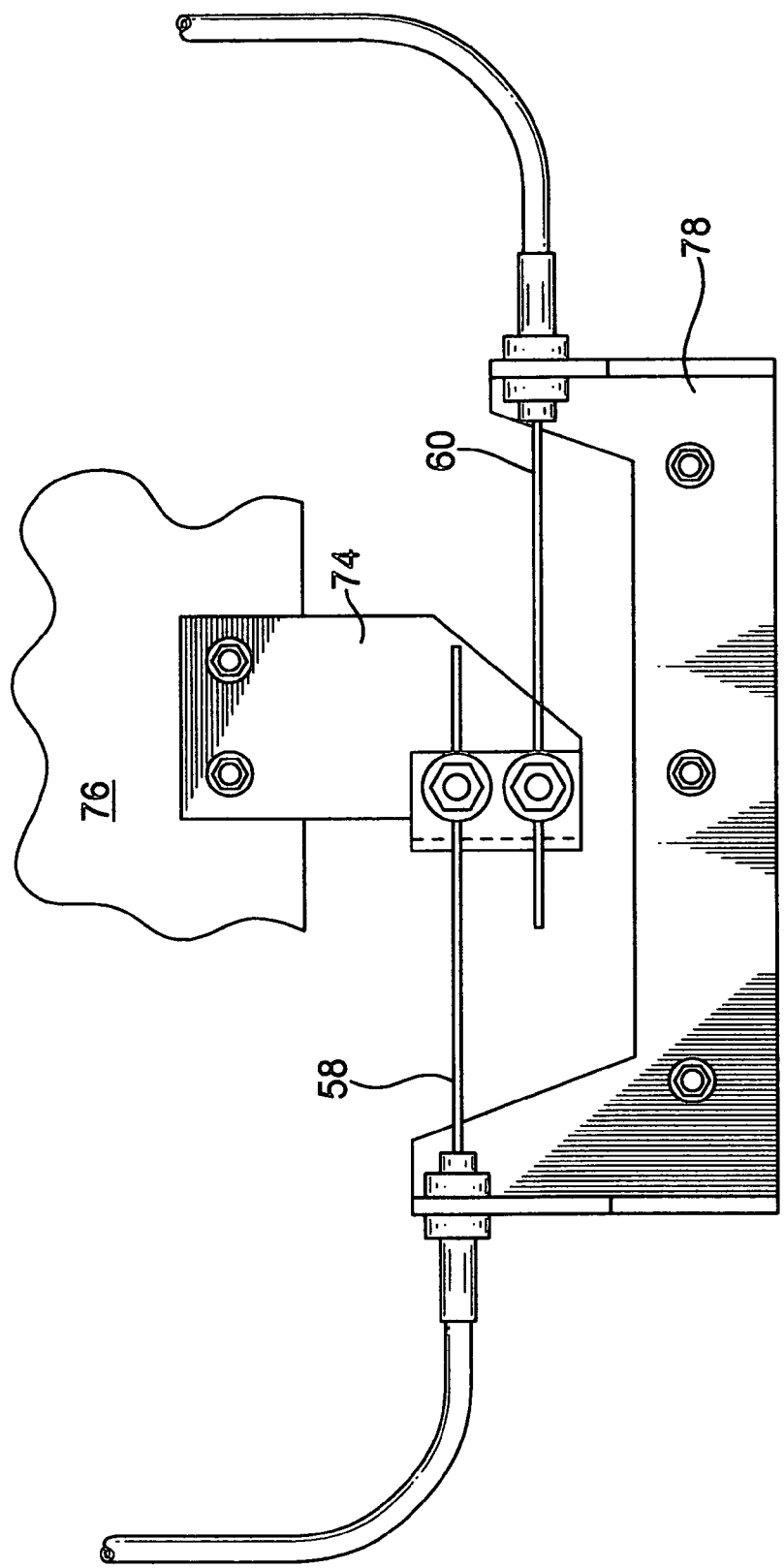
FIG. 8 illustrates a preferred type of mechanism for controlling the rotational position of the inventive coolant delivery apparatus.

With the coolant assembly positioned attached to the spindle housing 48 as shown in FIG. 7, one or more, preferably four, coolant nozzles 54 which extend from the coolant header 44 are positioned adjacent to the grinding wheel 8. Coolant is supplied to the coolant header 44 via a feed pipe 56. Alternatively, coolant may be supplied through spindle housing 48 to appropriate channels extending through mounting adapter 42 and communicating with coolant header 44.

Changing the grinding zone position on the grinding wheel is accomplished by X direction movement in the machine of FIG. 1. The present invention provides means to rotate the coolant header 44 in a synchronized manner with movement of the grinding wheel in the X direction so that the position of the coolant nozzles moves to remain adjacent to the grinding zone being utilized. Rotation of the coolant header 44 is preferably effected by a cable system comprising a pair of cables 58, 60 (FIG. 5) each attached to a respective end 64, 66 of a semi-circular plate 62 attached to the coolant header 44. The periphery of plate 62 is grooved to accommodate the cables 58, 60 with each cable having a ball at its end which fits into a similarly shaped receptacle located at each plate end 64, 66. The cables extend from the plate ends 64, 66, along the groove in the plate periphery, over the respective pulley 68, 70 enclosed in housing 72, and extend to a bracket 74 mounted to the X direction slide 76 of the grinding machine. Another bracket 78 is mounted to a stationary surface adjacent slide 76 and the sheaths of the cables 58, 60 are attached to the bracket 78 so as to hold them stationary and permit movement of the cables within.

With the above arrangement, movement of the slide 76 in the X direction will pull a respective cable 58 or 60 causing movement of plate 62 and, hence, rotation of coolant header 44 and nozzles 54. Thus, for example, if movement of the grinding zone in FIGS. 4(*a*) and (*b*) from $Z_2$ to $Z_3$ requires a 1 inch (25.4 mm) movement of X direction slide 76, cable 58 will be pulled by this amount and coolant header 44 and nozzles 58 will likewise rotate by this amount to shift the position of the coolant nozzles from zone $Z_2$ to zone $Z_3$ about the grinding wheel. The same principle applies to movement between any grinding zones on the grinding wheel.

While a cable system has been illustrated and is preferred, other systems that synchronize movement in the X-direction to repositioning of the coolant nozzles 58 are also contemplated. For example, a system utilizing servomotors may be utilized. Also, although the system shown employs a 1:1 ratio of X-direction movement to nozzle rotation distance, other ratios are within the scope of the present invention.

It is further noted that although the present invention has been discussed with the respect to a grinding machine having the configuration as shown in FIG. 1, the invention is not limited thereto. The present invention applies to any grinding machine where moving from one grinding zone to another involves a component of motion in the plane of the grinding wheel where the component is perpendicular to the direction of the axis of the clamping mechanism. In other words, the present invention may be applied to any grinding machine having directions of motion corresponding to X and Z of FIG. 1.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for delivering coolant to the area of contact between a workpiece and a contact zone of a rotatable tool on a machine during a machining process, wherein at least two different contact zones of said tool are utilized in the machining of said workpiece, said apparatus comprising:
   a plurality of coolant nozzles positionable to direct coolant to the area of contact between the workpiece and the contact zone of the tool,
   positioning means for changing the position of said plurality of coolant nozzles concurrently with a change to another contact zone of said tool, whereby during machining with said another contact zone of said tool, coolant is directed to the area of contact between the workpiece and said another contact zone,
   wherein said plurality of coolant nozzles are attached to and in fluid communication with a coolant header, said coolant header being positionable with said plurality of coolant nozzles, and
   wherein movement from one contact zone to another contact zone on said tool comprises movement of said tool relative to the workpiece along at least one axis of motion on the machine, the repositioning of said plurality of coolant nozzles being synchronized with said movement of said tool along said at least one axis wherein a defined amount of movement of said tool yields a predetermined amount of repositioning movement of said plurality of coolant nozzles.

2. The apparatus of claim 1 wherein said coolant header is generally ring-shaped.

3. The apparatus of claim 1 wherein said coolant header is attached to an end of a spindle for rotating said tool.

4. The apparatus of claim 1 wherein said tool is a grinding wheel and said repositioning movement of said plurality of coolant nozzles is in a circular arc about said grinding wheel from said one contact zone to said another contact zone.

5. The apparatus of claim 1 wherein movement from one contact zone to another contact zone on said tool comprises movement of said tool relative to the workpiece along one axis of motion on the machine.

6. The apparatus of claim 1 wherein said defined amount of movement of said tool is the same as the predetermined amount of repositioning movement of said plurality of coolant nozzles.

7. The apparatus of claim 1 wherein said positioning means for changing the position of said plurality of coolant nozzles comprises a cable system.

8. The apparatus of claim 1 wherein said positioning means for changing the position of said plurality of coolant nozzles and coolant header comprises a cable system having a pair of cables, said coolant header having first and second ends with one of said pair of cables being attached to the first end and the other of said pair of cables being attached to the second end.

9. The apparatus of claim 1 further comprising said coolant header being positionable with said plurality of coolant nozzles along a circular arc, said positioning means for changing the position of said plurality of coolant nozzles comprising a cable system communicating with and extending between said coolant header and a slide on the machine for effecting said movement of said tool relative to the workpiece along an axis of motion.

10. The apparatus of claim 9 wherein a defined amount of movement of said slide along the axis effects movement of said cable system whereby said coolant header is positioned by an amount along the circular arc equal to said defined amount.

11. The apparatus of claim 1 wherein said positioning means for changing the position of said plurality of coolant nozzles comprises at least one servomotor.

12. A method for machining a workpiece and delivering coolant to the area of contact between the workpiece and a contact zone of a rotatable tool on a machine during the machining process, wherein at least two different contact zones of said tool are utilized in the machining of said workpiece, said method comprising:
   positioning a plurality of coolant nozzles to direct coolant to the area of contact between the workpiece and the contact zone of the tool, said plurality of coolant nozzles being attached to and in fluid communication with a coolant header,
   machining said workpiece at the contact zone of said tool and simultaneously delivering coolant through said plurality of coolant nozzles to the area of contact between said tool and workpiece,
   moving said tool and workpiece relative to one another to machine said workpiece at another contact zone of said tool,
   changing the position of said plurality of coolant nozzles concurrently with said moving to another contact zone of said tool, said coolant header changing position with said plurality of coolant nozzles, wherein the moving from one contact zone to another contact zone on said tool comprises moving said tool relative to the workpiece along at least one axis of motion on the machine, said changing the position of said plurality of coolant nozzles being synchronized with said movement of said tool along said at least one axis wherein a defined amount of movement of said tool yields a predetermined amount of repositioning movement of said plurality of coolant nozzles,
   machining said workpiece with said another contact zone of said tool and simultaneously delivering coolant to the area of contact between the workpiece and said another contact zone of said tool.

13. The method of claim 12 wherein said moving occurs along an axis of said machine and in a defined amount, and wherein the change in position of said plurality of coolant nozzles is by an amount that is the same as said defined amount.

14. The method of claim 12 wherein said moving occurs along an axis of said machine and in a defined amount, and wherein the change in position of said plurality of coolant nozzles and said coolant header is by an amount that is the same as said defined amount.

15. The method of claim 12 wherein said changing position is along a circular arc.

* * * * *